United States Patent
Yasuoka

(10) Patent No.: US 9,525,842 B2
(45) Date of Patent: Dec. 20, 2016

(54) DATA MANAGEMENT DEVICE, DATA MANAGEMENT METHOD, INFORMATION PROCESSING CLIENT, AND COMPUTER-READABLE MEDIUM FOR CONVERTING IMAGE DATA FROM A FIRST FORMAT TO A SECOND FORMAT

(71) Applicant: FUJI XEROX CO., LTD., Minato-ku, Tokyo (JP)

(72) Inventor: Daisuke Yasuoka, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/228,541

(22) Filed: Mar. 28, 2014

(65) Prior Publication Data

US 2014/0354851 A1 Dec. 4, 2014

(30) Foreign Application Priority Data

May 31, 2013 (JP) ................................. 2013-116391

(51) Int. Cl.
*H04N 5/76* (2006.01)
*H04N 5/907* (2006.01)
(Continued)

(52) U.S. Cl.
CPC ............ *H04N 5/907* (2013.01); *G06F 3/0643* (2013.01); *G06F 17/3007* (2013.01);
(Continued)

(58) Field of Classification Search
CPC ............... H04N 5/907; G06F 17/30244; G06F 17/3028;G06F 17/30858; G06F 17/3007; G06F 17/30115; G06F 17/30126; G06F 17/30123; G06F 3/0643
(Continued)

(56) References Cited

U.S. PATENT DOCUMENTS 5,717,496 A * 2/1998 Satoh ................... H04N 1/2125
358/1.15
6,356,357 B1 * 3/2002 Anderson et al. ........... 358/1.17
(Continued)

FOREIGN PATENT DOCUMENTS

| JP | 11-134227 A | 5/1999 |
|---|---|---|
| JP | 2002-041502 A | 2/2002 |

(Continued)

OTHER PUBLICATIONS

Mynavi Corp., Mac Fan Magazine, vol. 20(1), 346th Issue, Tokyo, Japan, Jan. 1, 2012, 4 pages.
(Continued)

*Primary Examiner* — Ngoc-Yen Vu
(74) *Attorney, Agent, or Firm* — Sughrue Mion, PLLC

(57) ABSTRACT

A data management device includes a converter and a storage unit. The converter, in response to an instruction to move image data of a first format generated by image capture by an image capture unit and stored in a predetermined first memory area to a second memory area, converts the image data from the first format to a second format. The storage unit stores the image data converted into the second format in the second memory area. The converter does not perform the conversion in the case in which the storage source of the image data to be moved is not the first memory area.

12 Claims, 9 Drawing Sheets

(51) Int. Cl.
    *G06F 17/30*    (2006.01)
    *G06F 3/06*     (2006.01)
    *H04N 5/77*     (2006.01)
    *H04N 5/91*     (2006.01)
    *H04N 9/82*     (2006.01)

(52) U.S. Cl.
    CPC .. *G06F 17/30123* (2013.01); *G06F 17/30126* (2013.01); *H04N 5/772* (2013.01); *H04N 5/91* (2013.01); *H04N 9/8205* (2013.01)

(58) Field of Classification Search
    USPC .......................................... 348/231.99, 231.2
    See application file for complete search history.

(56)         References Cited

U.S. PATENT DOCUMENTS

| 8,832,308 B2* | 9/2014 | Tsutsui | G06F 17/30017 |
| | | | 709/231 |
| 2002/0143792 A1* | 10/2002 | Belu | 707/200 |
| 2003/0080977 A1* | 5/2003 | Scott | G06F 17/30274 |
| | | | 345/629 |
| 2004/0249863 A1 | 12/2004 | Kawamura | |
| 2011/0107198 A1* | 5/2011 | Kuroda | G06F 17/30115 |
| | | | 715/234 |
| 2013/0080583 A1* | 3/2013 | Takagi | G06F 17/30861 |
| | | | 709/217 |
| 2013/0346361 A1* | 12/2013 | Hashimoto | G06F 17/30115 |
| | | | 707/609 |

FOREIGN PATENT DOCUMENTS

| JP | 2004-362091 A | 12/2004 |
| JP | 2008-225862 A | 9/2008 |
| JP | 2011-186870 A | 9/2011 |

OTHER PUBLICATIONS

"Exploring the profound world of MAC", Chigusa Kukuri, Apr. 24, 2010, vol. 5 (11 pages).

Office Action issued by the Japanese Patent Office in corresponding Japanese Patent Application No. 2014-035263, dated May 27, 2014.

* cited by examiner

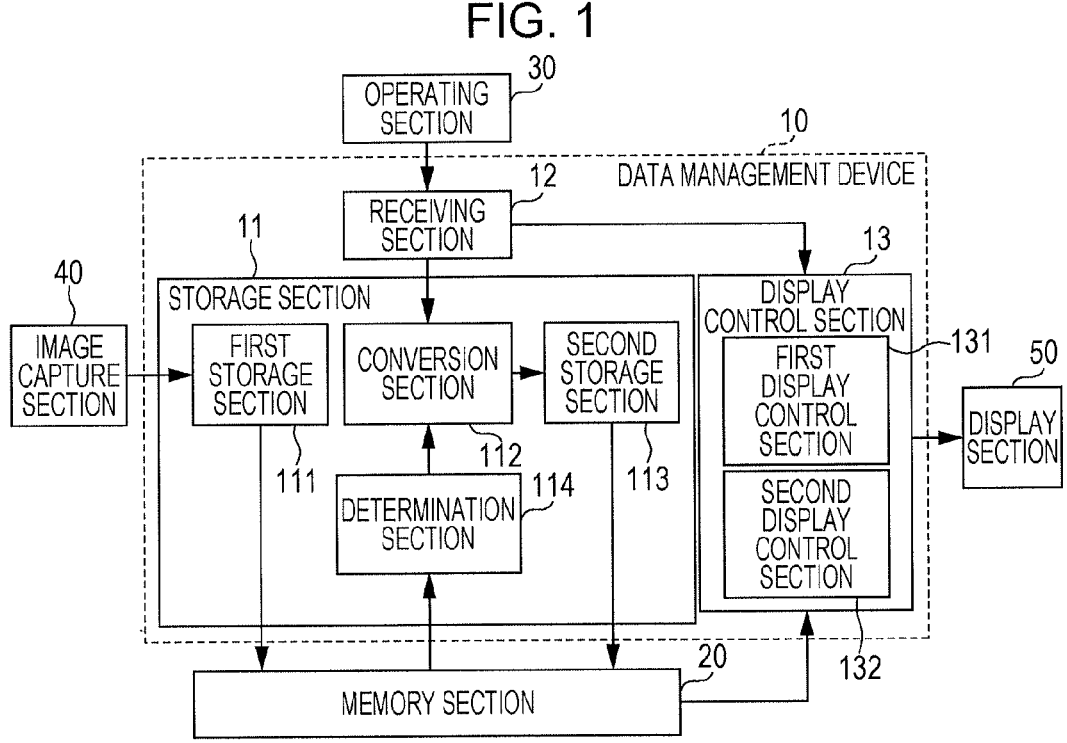
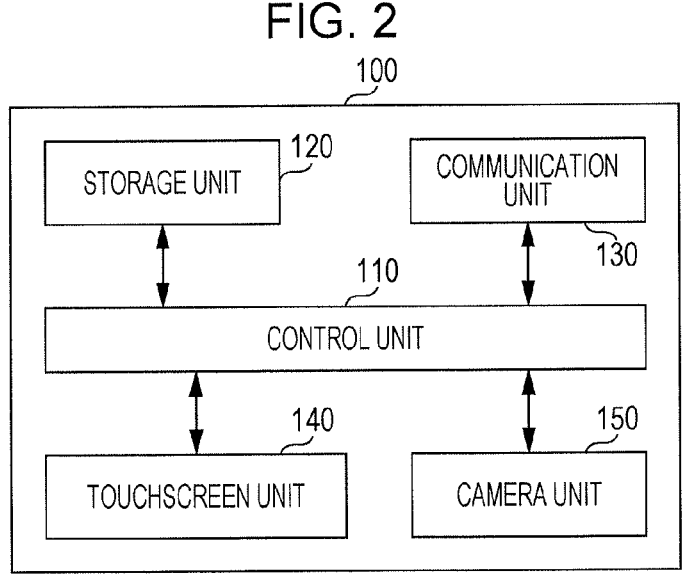

DATA MANAGEMENT DEVICE, DATA MANAGEMENT METHOD, INFORMATION PROCESSING CLIENT, AND COMPUTER-READABLE MEDIUM FOR CONVERTING IMAGE DATA FROM A FIRST FORMAT TO A SECOND FORMAT

CROSS-REFERENCE TO RELATED APPLICATIONS

This application is based on and claims priority under 35 USC 119 from Japanese Patent Application No. 2013-116391 filed May 31, 2013.

BACKGROUND

Technical Field

The present invention relates to a data management device, a data management method, an information processing client, and a computer-readable medium.

SUMMARY

According to an aspect of the invention, there is provided a data management device that includes a converter and a storage unit. The converter, in response to an instruction to move image data of a first format generated by image capture by an image capture unit and stored in a predetermined first memory area to a second memory area, converts the image data from the first format to a second format. The storage unit stores the image data converted into the second format in the second memory area. The converter does not perform the conversion in the case in which the storage source of the image data to be moved is not the first memory area.

BRIEF DESCRIPTION OF THE DRAWINGS

An exemplary embodiment of the present invention will be described in detail based on the following figures, wherein:

FIG. 1 is a block diagram illustrating a functional configuration of a data management device;

FIG. 2 is a block diagram illustrating a hardware configuration of an information processing client;

DETAILED DESCRIPTION

Example

Figure 3:
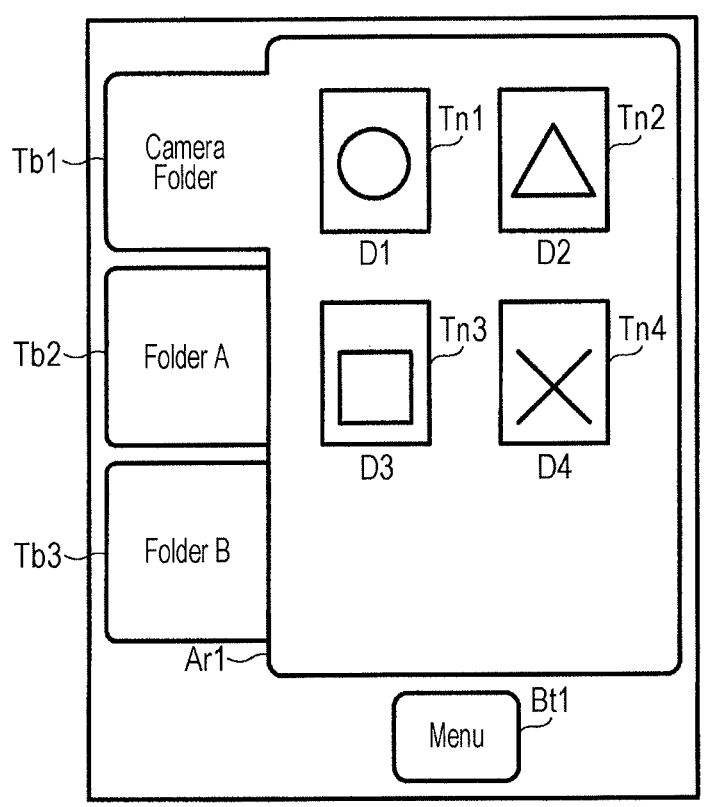
FIG. 3 is a diagram illustrating an exemplary display of a screen on an information processing client.

FIG. 1 is a block diagram illustrating a functional configuration of a data management device 10 given as an example of the present invention. The data management device 10 is equipped with a storage section 11, a receiving section 12, and a display control section 13. The storage section 11 more specifically includes a first storage section 111, a conversion section 112, a second storage section 113, and a determination section 114. Also, the display control section 13 more specifically includes a first display control section 131 and a second display control section 132.

Additionally, besides the data management device 10, FIG. 1 also illustrates a memory section 20, an operating section 30, an image capture section 40, and a display section 50. These structural elements may be included in the data management device 10 but are not limited thereto, and may also be the structural elements of other devices connected to the data management device 10.

Herein, the memory section 20 stores data. The memory section 20 includes multiple memory areas for storing data. The "multiple memory areas" referred to herein may each be physically different (for example, separate semiconductor memory modules), but may also be logically partitioned memory areas on the same memory section.

The operating section 30 gives instructions to the data management device 10 according to user operations. The operating section 30 is realized by elements such as buttons, switches, or a touchscreen sensor, for example.

The image capture section 40 captures an image of a subject, and generates image data expressing the subject. The image capture section 40 is equipped with an image sensor that converts light intensity into an electrical signal, and a circuit that processes and converts the electrical signal into image data in a predetermined format. The term format referred to herein at least denotes a data format, but may also denote another type that characterizes data.

The display section 50 displays an image. The display section 50 may be a section that displays an image on a screen made up of display elements such as liquid crystal elements or organic electroluminescence (EL) elements, but may also be a section that presents a display by projecting an image, like a projector.

The data management device 10 is an information processing device that cooperates with the memory section 20, the operating section 30, the image capture section 40, and the display section 50 to manage image data. Herein, management specifically refers to enabling easier handling of image data by a user, and means format conversion and storage of image for this purpose. Also, the data management device 10 manages image data while also providing the user with a graphical user interface (GUI) for managing the image data.

The storage section 11 stores image data in the memory section 20. Also, when storing image data, the storage section 11 executes a process of converting the format as appropriate. Note that storage by the storage section 11 includes moving image data from a one memory area to a separate memory area. Also, the movement of data referred to herein is taken to include the copying of data.

The first storage section 111 stores image data generated by the image capture section 40. Image data generated by the image capture section 40 is data in a format determined at the image capture section 40. This format is hereinafter designated the "first format". The first storage section 111 stores image data of the first format in a predetermined memory area. This memory area is hereinafter designated the "first memory area".

Specifically, the first memory area is predetermined as an area in which image data generated by the image capture section 40 is stored. For example, the first memory area is determined by an operating system (OS) of the data management device 10. Typically, the first memory area is recognized by the user as a directory (folder) given a specific name.

The conversion section 112 converts the format of image data. The conversion section 112 converts image data of the first format stored in the first memory area into a separate format. Hereinafter, the format after conversion by the conversion section 112 is designated the "second format". The conversion section 112 may also execute format conversion according to an operation (move instruction) received by the receiving section 12.

The second storage section 113 stores images data of the second format. The second storage section 113 stores post-conversion image data in a different memory area than pre-conversion. Hereinafter, this memory area is designated the "second memory area". In other words, the second memory area is a memory area that differs from the first memory area.

The determination section 114 whether or not conversion by the conversion section 112 is appropriate at the time of storage by the storage section 11. The determination section 114 determines whether or not a movement of image data is a simple move, or in other words movement that does not involve format conversion. For example, the determination section 114 may determine whether or not conversion by the conversion section 112 is appropriate by determining whether or not the storage source of the image data to be moved is the first memory area.

The receiving section 12 receives user operations. The receiving section 12 receives user operations by the operating section 30 as information, and causes this information to be reflected in the behavior of the storage section 11 and the display control section 13. Note that the operations received by the receiving section 12 include an instruction for moving image data.

The display control section 13 controls the display of an image by the display section 50. Stated differently, the display control section 13 causes the display section 50 to display an image. The display control section 13 controls the display of an image on the basis of user operations received by the receiving section 12 or data stored in the memory section 20.

The first display control section 131 causes display of an image representing image data stored in the first memory area. Meanwhile, the second display control section 132 causes display of an image representing image data stored in the second memory area. Herein, an "image representing image data" refers to an image that enables identification of the relevant image data. An image representing image data may be a thumbnail generated on the basis of the relevant image data, but may also be an image displaying information such as the file name of the relevant image data. A thumbnail refers to a reduced image of an image expressed by image data.

FIG. 2 is a block diagram illustrating a hardware configuration of an information processing client 100, which is an example a specific configuration of a data management device 10. Herein, the information processing client 100 is taken to be a mobile communication client that includes camera functionality, such as a smartphone or tablet personal computer (PC). The information processing client 100 is equipped with a control unit 110, a storage unit 120, a communication unit 130, a touchscreen unit 140, and a camera unit 150.

The control unit 110 controls the behavior of the respective units of the information processing client 100. The control unit 110 is equipped with a computational processing device such as a central processing unit (CPU) and a graphics processing unit (GPU), and memory that corresponds to a primary memory device, and controls the behavior of the respective units of the information processing client 100 by executing a program. In this example, besides an OS, the control unit 110 also executes a document management application discussed later. The control unit 110 corresponds to a computer that realizes functionality corresponding to the data management device 10 by executing a program.

The storage unit 120 stores data, and corresponds to an example of the memory section 20. The storage unit 120 is equipped with a non-volatile memory medium such as flash memory, and stores data (such as image data) used by the control unit 110. In addition, the storage unit 120 may also be configured to include a memory medium that is freely attachable and removable with respect to the information processing client 100, like a memory card.

The communication unit 130 transmits and receives data to and from an external device or a network. For example, the communication unit 130 is equipped with a communication chip that performs data modulation and demodulation or the like, and communicates with an external device via a network such as a mobile communication network or the Internet. Note that the external device referred to herein may be a storage device that functions as a memory area of the information processing client 100. A memory area accessed via the communication unit 130 in this way is hereinafter designated "external storage". External storage is also called online storage.

The touchscreen unit 140 displays an image while also sensing user operations. In other words, the touchscreen unit 140 corresponds to an example of the operating section 30 and the display section 50, and is double equipped with these functions. The touchscreen unit 140 is equipped with a display panel made up of display elements and a sensor provided in correspondence with the display panel, and displays an image according to image data supplied from the control unit 110, while also supplying the control unit 110 with operation information indicating an operation on an image (such as an icon) displayed on the screen.

The camera unit 150 captures an image of a subject. The camera unit 150 is provided with an image sensor such as a charge-coupled device (CCD) sensor or a complementary metal-oxide-semiconductor (CMOS) sensor. The camera unit 150 corresponds to an example of the image capture section 40. Note that the image capture section 40 may also be realized by cooperative action of the control unit 110 with the camera unit 150.

Note that in this example, image data generated as a result of image capturing by the camera unit 150 is taken to be in the JPEG format. In other words, the "first format" in this example is the JPEG format. However, the size and compression ratio of image data in the first format is not particularly limited herein.

The configuration of the information processing client 100 is as discussed above. Based on this configuration, the information processing client 100 realizes management of various data, including image data, by executing a document management application. Herein, the format of data managed by the document management application corresponds to the second format. In this example, data managed by the document management application is data whose file format is Portable Document Format (PDF) or XDW format. The user is able to select which format to adopt. Herein, XDW format refers to the file format primarily handled in Docu- Works (registered trademark), which is software developed by Fuji Xerox. Hereinafter, data of the second format managed by the document management application is designated a "document file".

The document management application handles data in the second format when handling image data. Consequently, in the case in which image data to be handled is in the first format, the document management application converts the image data to the second format. Specifically, in the case of handling image data being stored in a memory area that differs from a memory area reserved for the document management application, the document management application converts the image data to the second format when the image data is not in the second format. Herein, the memory area that differs from a memory area reserved for the document management application refers to the first memory area, and is a memory area managed by the OS. In other words, when an instruction is given to move image data being stored in a memory area that the document management application itself is not managing, the document management application converts the format of the image data to the second format (that is, a format suited to management by the document management application).

Figure 4:
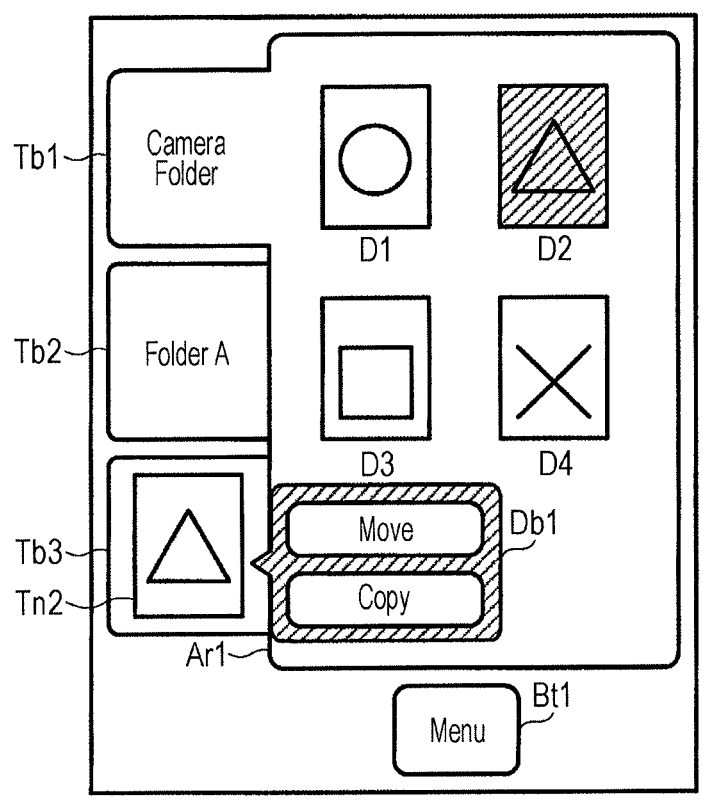
FIG. 4 is a diagram illustrating an exemplary display of a screen on an information processing client.
Figure 5:
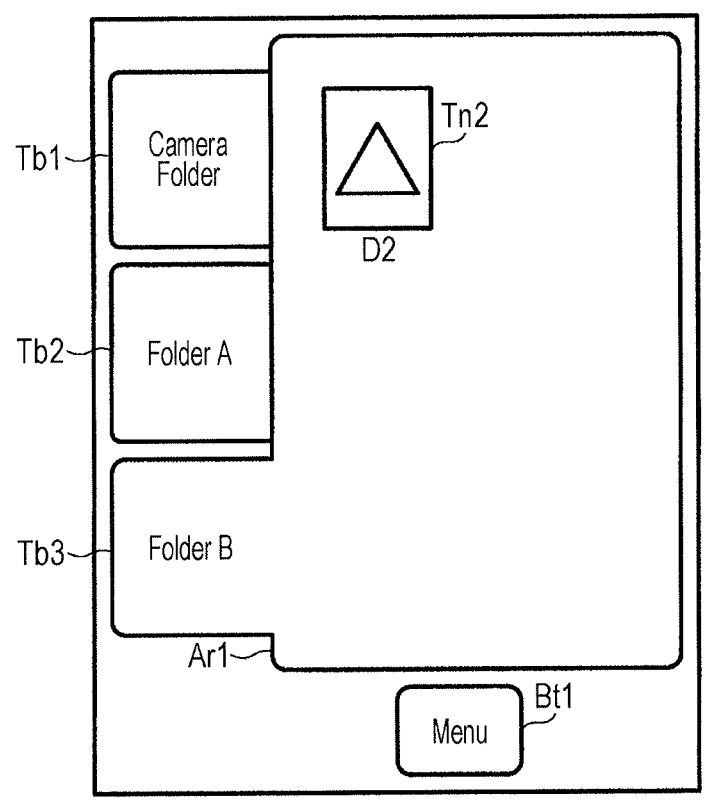
FIG. 5 is a diagram illustrating an exemplary display of a screen on an information processing client.
Figure 6:
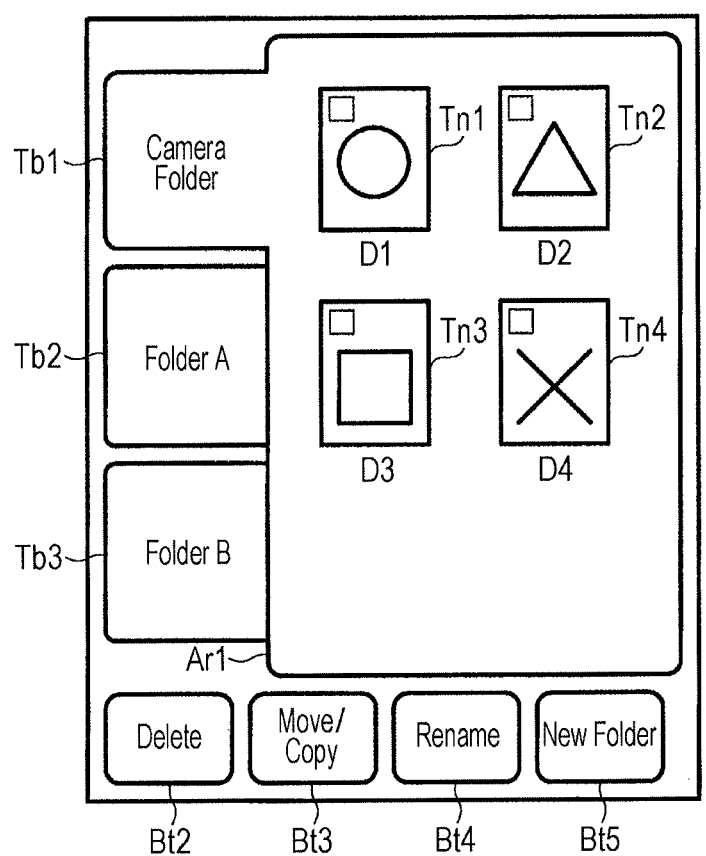
FIG. 6 is a diagram illustrating an exemplary display of a screen on an information processing client.
Figure 7:
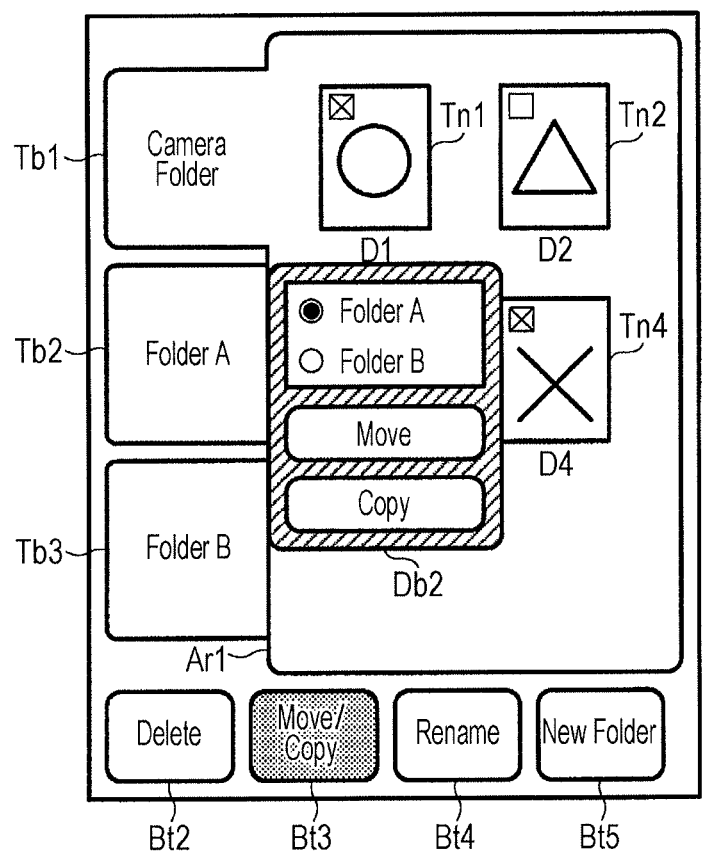
FIG. 7 is a diagram illustrating an exemplary display of a screen on an information processing client.
Figure 8:
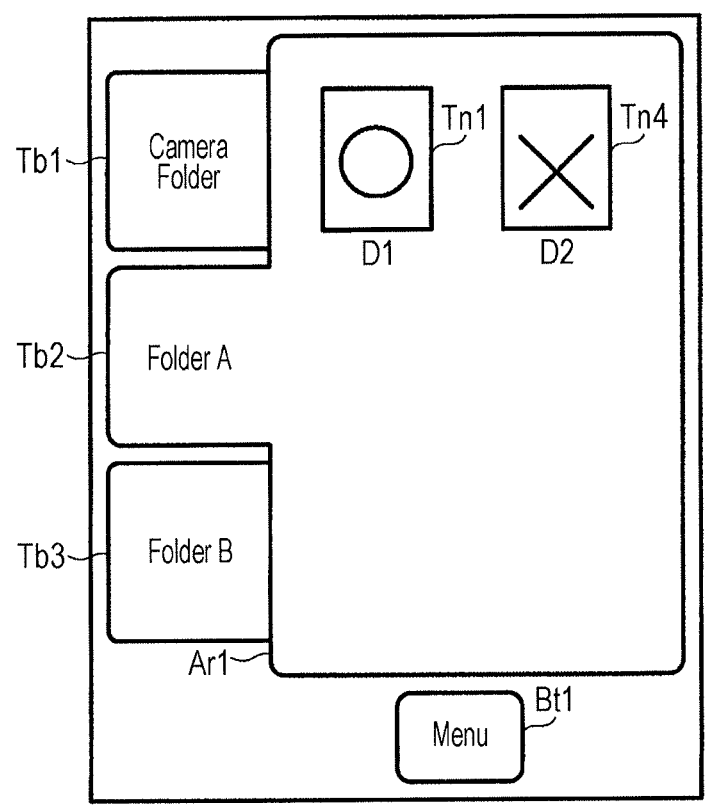
FIG. 8 is a diagram illustrating an exemplary display of a screen on an information processing client.

FIGS. 3 to 9 are diagrams illustrating exemplary displays of a screen on the information processing client 100. FIGS. 3 to 5 are diagrams illustrating screen transitions in the case of moving one item of image data. Meanwhile, FIGS. 6 to 8 are diagrams illustrating screen transitions in the case of moving multiple items of image data in a batch.

Displayed on the screen illustrated in FIG. 3 are tabs Tb1, Tb2, and Tb3 indicating respective memory areas, an area Ar1 which is a display area indicating data being stored in a memory area, and a Menu button Bt1. Herein, the tab Tb1 corresponds to the first memory area, while the tabs Tb2 and Tb3 correspond to second memory areas. Herein, assume that the name "Camera Folder" is given to the memory area corresponding to the tab Tb1, "Folder A" to the memory area corresponding to the tab Tb2, and "Folder B" to the memory area corresponding to the tab Tb3. The folders A and B may be provided in the storage unit 120, but may also be provided on external storage.

Also, in FIG. 3, thumbnails of image data being stored in the camera folder are being displayed in the area Ar1. The display state in this case is hereinafter designated the "state in which the camera folder is selected". The area Ar1 in the state in which the camera folder is selected corresponds to an example of a first display area of the present invention. In the example of FIG. 3, thumbnails Tn1, Tn2, Tn3, and Tn4 corresponding to image data D1, D2, D3, and D4 are displayed in the camera folder. Note that while information such as the file name, data format, and exchangeable image file format (Exif) information of the image data may be displayed together near the thumbnails, such information may also not be displayed.

In the case of wanting to moving image data being stored in the camera folder to another folder (memory area), the user gives an instruction to move the thumbnail of desired image data to a target folder. This instruction is hereinafter designated a "move instruction". Herein, assume that the move instruction is realized by an operation of dragging (moving while a finger is touching the screen) a thumbnail to one of the tabs Tb2 and Tb3, and dropping (releasing the finger from the screen) at a target position. Note that the move instruction may also be realized by another operation, such as an operation of tapping (selecting with a finger) a thumbnail, and then tapping the tab of a target folder.

FIG. 4 is a diagram illustrating a screen transition in the case of giving a move instruction to move the image data D2 to the folder B. Specifically, this move instruction is realized by dragging and dropping the thumbnail Tn2 corresponding to the image data D2 to the position of the tab Tb2 corresponding to the folder B. At this point, the information processing client 100 visually expresses that the image data D2 is about to be moved to the folder B by overlaying the thumbnail Tn2 over the tab Tb2. In addition, at this point the information processing client 100 moves the thumbnail Tn2 so as to track the motion of the user's finger. At this point, the thumbnail Tn2 being moved may be displayed in the first display area, a second display area, or a display area different from both the first display area and the second display area.

Note that at this point the information processing client 100 may also display an image that substitutes for the thumbnail Tn2 (a substitute image) at the position where the thumbnail Tn2 was first being displayed in the area Ar1. The substitute image is obtained by changing the thumbnail Tn2 from a color display to a monochrome display, or by inverting the colors (tones) of the image, for example.

Also, before storing the image data D2 in the second memory area, the information processing client 100 displays a dialog box Db1 querying the user whether to move or copy the image data D2. The user selects whether the current operation is "Move" or "Copy". Note that moving data refers to storing data in the storage destination without remaining in the storage source, whereas copying data refers to storing data in the storage destination while also remaining in the storage source.

Note that the display of the dialog box Db1 may also be omitted. For example, the question of whether to execute "Move" or "Copy" in the case of giving a move instruction may also be determined in advance with a user-configured setting or the like. In this case, it is sufficient for the information processing client 100 to perform the process determined in advance, without receiving a user selection.

After the user gives a move instruction, the information processing client 100 converts the format of the image data in response. FIG. 5 is a diagram illustrating a screen after format conversion. At this point, the information processing client 100 changes the display state of the area Ar1 from a state in which the camera folder is selected to a state in which the folder B is selected. The area Ar1 in the state in which the folder B is selected corresponds to an example of a second display area of the present invention. At this point, the information processing client 100 switches the thumbnails displayed in the area Ar1 from those of the image data being stored in the camera folder to those of the image data being stored in the folder B. In the example in FIG. 5, since the image data D2 is stored in the folder B as a result of the move instruction illustrated in FIG. 4, the thumbnail Tn2 corresponding to the image data D2 is being displayed in the area Ar1.

On the other hand, in the case of moving multiple items of image data in a batch, the user taps the Menu button Bt1. After the Menu button Bt1 is tapped in the example in FIG. 3, the information processing client 100 displays the screen illustrated in FIG. 6. On this screen, the information processing client 100 displays a Delete button Bt2, a Move/Copy button Bt3, a Rename button Bt4, and a New Folder button Bt5, while also displaying checkboxes corresponding to each thumbnail.

The Delete button Bt2 is a button for deleting image data corresponding to a selected thumbnail from a memory area (in the case of FIG. 6, the camera folder). The Move/Copy button Bt3 is a button for moving or copying image data corresponding to a selected thumbnail. The Rename button Bt4 is a button for changing the file name of image data corresponding to a selected thumbnail. The New Folder button Bt5 is a button for displaying a folder for storing image data, and newly assigning a second memory area corresponding to that folder. The information processing client 100, upon receiving an operation of tapping these buttons, executes processes according to the respective buttons.

FIG. 7 is a diagram illustrating a screen in the case of selecting the thumbnails Tn1 and Tn4 and then tapping the Move/Copy button Bt3 on the screen illustrated in FIG. 6. At this point, the information processing client 100 sets the checkboxes for the thumbnails Tn1 and Tn4 to checked, and also displays a dialog box Db2 that queries image data storage destination and the type of move ("Move" or "Copy"). The user uses the dialog box Db2 to select a storage destination folder and the type of move. The move instruction in the case of moving multiple items of image data is realized by this series of operations.

After such a move instruction is given, the information processing client 100 converts the format of the image data in response. FIG. 8 is a diagram illustrating a screen after format conversion. Note that in this example, the user is assumed to have selected the folder A as the storage destination of the image data. At this point, the information processing client 100 changes the display state of the area Ar1 from a state in which the camera folder is selected to a state in which the folder A is selected. As a result, the thumbnails Tn1 and Tn4 are displayed in the area Ar1. The area Ar1 in the state in which the folder A is selected corresponds to an example of a second display area of the present invention.

Figure 9:
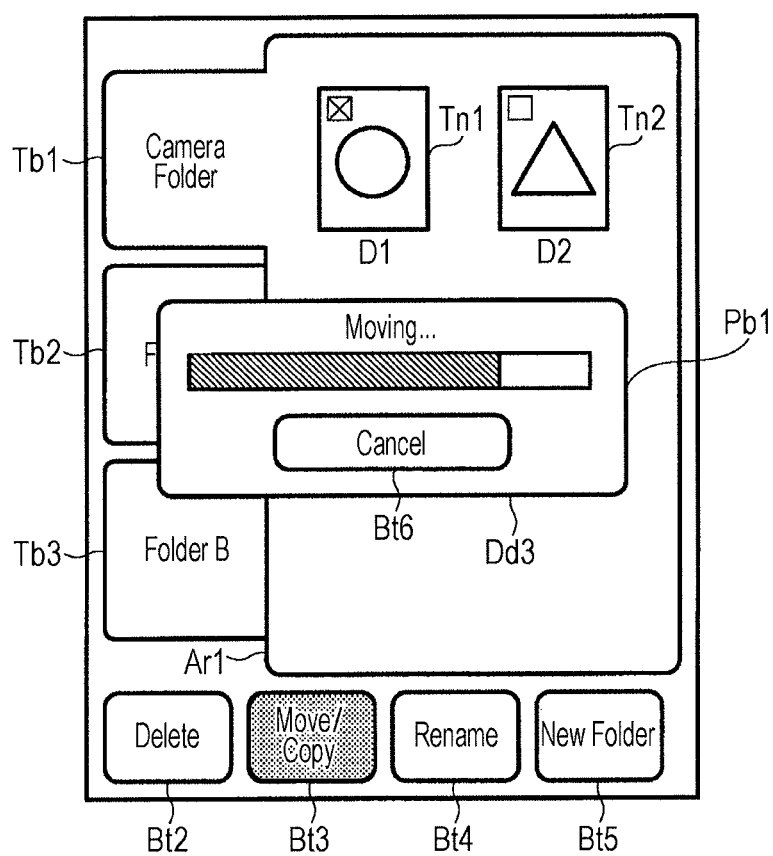
FIG. 9 is a diagram illustrating an exemplary display of a screen on an information processing client.

The information processing client 100 executes format conversion in parallel while performing a screen transition for moving image data in this way. The information processing client 100 may also notify the user of the format conversion execution condition, and receive an operation that cancels the format conversion (and the image data move) being executed. FIG. 9 is a diagram exemplifying a dialog box Db3 that displays a progress bar Pb1 and a Cancel button Bt6. The progress bar Pb1 is an image indicating the execution condition (progress) of a format conversion by the length of a bar. The Cancel button Bt6 is a button for cancelling the format conversion (and the image data move).

Note that the move instructions illustrated herein are merely examples. Any kind of operation may be used as a move instruction, insofar as the operation enables image data in a storage source to be specified, and a memory area (second memory area) of a storage destination to be specified.

Figure 10:
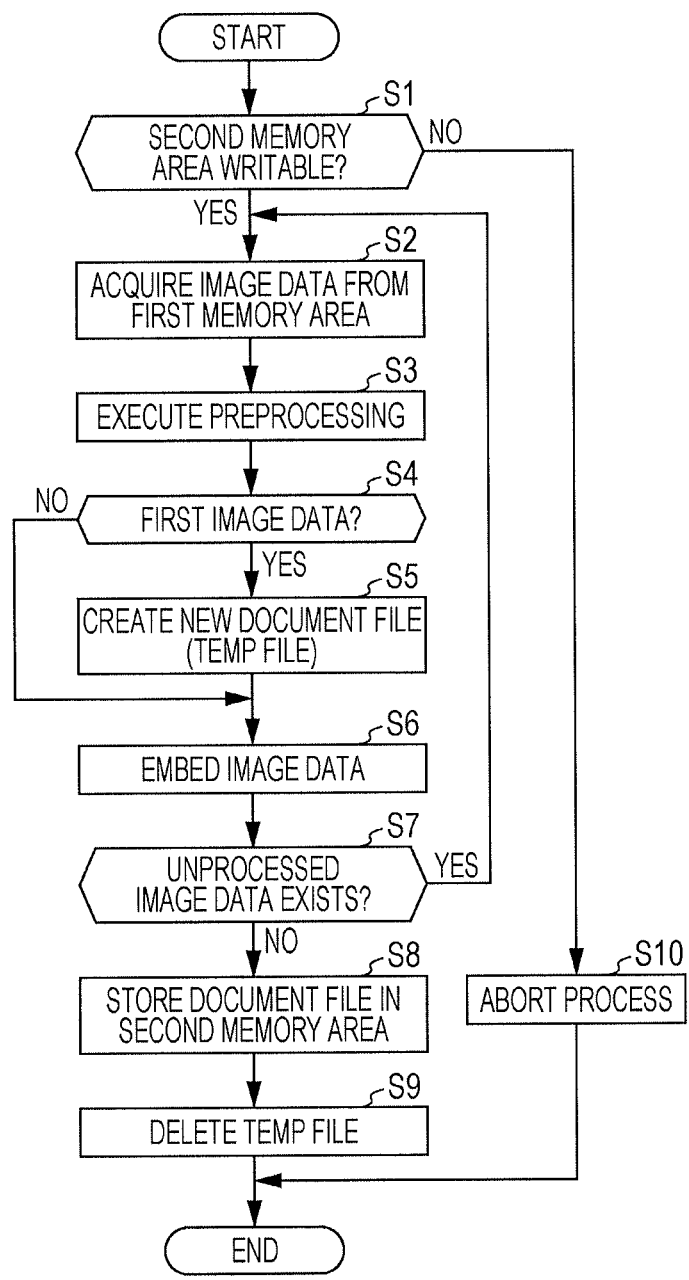
FIG. 10 is a flowchart illustrating a process executed by an information processing client.

FIG. 10 is a flowchart illustrating a process executed by the information processing client 100 during format conversion. The process illustrated in FIG. 10 is executed by the control unit 110 of the information processing client 100 according to a move instruction given by the user, and is realized by the document management application.

In this process, first, the control unit 110 determines whether or not data is writable to the second storage destination, that is, the second memory area (step S1). For example, the control unit 110 determines whether or not the user has the authority to write data to the second memory area indicated as the storage destination. Also, in the case in which the second memory area of the storage destination is external storage, the control unit 110 may determine whether or not the external storage is accessible via a network. In the case in which data is not writable to the second memory area, the control unit 110 aborts the process (step S10). At this point, the control unit 110 may also notify the user that data could not be written to the indicated storage destination.

If data is writable to the storage destination, the control unit 110 reads and acquires image data from the first memory area (step S2). Subsequently, the control unit 110 executes preprocessing on the image data that was read out (step S3). Herein, preprocessing refers to processing executed in advance prior to format conversion, and includes processing such as adjusting (changing) the size of the image data, for example. Preprocessing may also be omitted if unnecessary.

At this point, the control unit 110 determines whether or not the image data about to be converted is first image data (step S4). Herein, "first" means the initial image data embedded in a document file. For example, in the case of moving one item of image data as exemplified by FIGS. 3 to 5, the determination in step S4 becomes positive (YES). On the other hand, in the case of moving multiple items of image data in a batch as exemplified by FIGS. 3 and 6 to 8, the determination in step S4 only becomes positive for the format conversion of the initial image data, and becomes negative (NO) for subsequent image data.

If the image data is first in step S4, the control unit 110 creates a new document file in the second format (step S5). For example, the control unit 110 creates a document file in the storage unit 120 (or the memory of the control unit 110) as a temporary file. At this point, the document file does not include image data.

Subsequently, the control unit 110 embeds the image data that was read out in step S2 and preprocessed in step S3 into the created document file (step S6). Next, the control unit 110 determines whether or not unprocessed image data exists (step S7). The determination in step S7 becomes positive in the case of moving multiple items of image data in a batch, but becomes negative in the case of moving one item of image data. In the case of a positive determination in step S7, the control unit 110 collects the multiple items of image data into a single document file by repeating the processing in step S2 and thereafter for the second and subsequent image data.

In the case of no more unprocessed image data, or in other words, in the case in which all image data being processed has been embedded into the document file (temporary file), the control unit 110 stores the document file in the second memory area indicated by the user (step S8). Subsequently, the control unit 110 deletes the temporary file (step S9).

As above, in this example, format conversion of image data is conducted as a result of the user giving a move instruction, or in other words, an instruction to move image data from a given folder to a separate folder. In other words, the information processing client 100 executes format conversion of image data when image data is moved from a memory area not under management by a document management application (first memory area) to a memory area under management by that application (second memory area). At this point, since the user perceives this process as simply moving image data, the user is not required to pay particular attention to whether or not format conversion is being conducted, or whether or not the document management application is managing the memory area of the storage source or the storage destination. Additionally, the user becomes able to handle the converted image data as a single file, without paying particular attention to differences of format.

Also, in this example, the storage source of image data subjected to format conversion is a camera folder, or in other words, a memory area determined in advance for storing image data generated due to image capture by the camera unit 150. In other words, in this example, it is unnecessary to provide a memory area for format conversion and store image data therein in advance, such as a server or Web server.

Note that a document file generated by the information processing client 100 may also be edited by the user. Herein, editing may refer to writing information other than image data (such as text or graphics) into the document file, or deleting information written in the document file, for example. Additionally, the information processing client 100, in response to a user operation, may also split a document file collecting multiple items of image data into individual items of image data, and convert the image data into respectively separate document data.

[Modifications]

The foregoing example is one mode of carrying out the present invention. The present invention is not limited to this example, and may also be carried out in other modes. For example, the present invention may also be carried out in the modes exemplified below. In addition, the present invention may also be carried out by combining multiple modifications as appropriate.

(1) When moving image data in the present invention, the storage source of the image is not strictly limited to being the first memory area. For example, in the example discussed above, cases such as moving image data (more specifically, a document embedded with image data) from the folder A to the folder B are also conceivable. In such cases, format conversion of image may be omitted.

Consequently, in the case of systematically anticipating such moving, when executing format conversion of image data, the control unit 110 determines whether or not the storage source of the image data is the first memory area. When the storage source of the image data is not the first memory area, the control unit 110 does not perform format conversion. As a result, the control unit 110 differentiates the process to execute depending on whether or not the storage source of the image data is the first memory area. However, at this point the control unit 110 may also execute other processing besides format conversion on the image data.

(2) A document file is not strictly limited to having multiple file formats. The file format of a document file may also be only one of the PDF and XDW formats discussed earlier. Additionally, even in the case of multiple file formats for a document file, the question of which to adopt may not be determined in advance. For example, a dialog box may be displayed at the time of format conversion of image data, and prompt the user to select which file format to adopt. Alternatively, the information processing client 100 may also be configured to allow a file format to be set for each folder. For example, a document file may be converted into PDF when stored in the folder A, and converted into the XDW format when stored in the folder B.

(3) A document file may be in a format that allows multiple items of image data to be included in a single file. Such file formats include the Tagged Image File Format (TIFF) and the like besides the PDF and XDW formats discussed earlier. However, the file format is not limited to such file formats in the case of generating a single document file for a single item of image data.

(4) The file format of image data is not limited to being the JPEG format. The file format of image data may also be the Portable Network Graphics (PNG) format, or a mixture of the JPEG format and the PNG format, for example. Furthermore, image data may also be so-called RAW images (raw image format).

(5) In the foregoing example, the images displayed in the first display area and the second display area before and after format conversion (images representing image data) are substantially the same thumbnails. However, the images displayed before and after conversion may also be mutually different images. For example, an image representing image data may also be an image in which letters or symbols indicating the file format are overlaid onto a thumbnail. In this case, the images displayed in the first display area and the second display area become different images before and after format conversion.

(6) In the foregoing example, the first display area and the second display area exist in a relationship such that when one is being displayed, the other is not being displayed. However, both the first display area and the second display area may also be displayed simultaneously on the same screen.

(7) An information processing client according to the present invention may also not be equipped with a touchscreen like the information processing client 100 discussed earlier. For example, an information processing client according to the present invention may also use a pointing device such as a touchpad or a mouse as an operating section. In addition, an information processing client according to the present invention is not strictly limited to being portable, and in addition, may also not include a function of communicating with a network or other device.

(8) The present invention may be carried out in the mode of a data management device as well as an information processing client equipped therewith. In addition, the present invention may also be provided as a program for causing a computer to realize the functionality of a data management device according to the present invention, or be provided in the mode of a recording medium recording such a program. Furthermore, a program according to the present invention may also be acquired from an external device via a network or some other form of communication, and downloaded to the information processing client.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data management device comprising:
   a converter configured to, in response to an instruction to move, to a second memory area, image data of a first format generated for an image captured by an image capture unit and stored in a first memory area, convert the image data from the first format to a second format; and
   a storage unit configured to store, in the second memory area, the image data converted into the second format,
   wherein the converter is configured such that, in response to an instruction to move, to the second memory area, image data of a first format generated for an image captured by the image capture unit and stored in a memory other than the first memory area, the converter is prohibited from converting the image data from the first format to the second format.

2. The data management device according to claim 1, wherein the second format is a format that allows a plurality of image data to be included in a single file, and in the case in which the instruction indicates moving a plurality of image data to the second memory area, the converter collects the plurality of image data into a single file.

3. The data management device according to claim 1, wherein the second memory area is any of the plurality of memory areas different from the first memory area, and the converter converts the image data into the second format, the second format being a format of the second memory area.

4. The data management device of claim 1, wherein the image data of the first format is only converted to the second format in response to the instruction to move the image data of the first format to the second memory area.

5. A data management device comprising:

a first display controller configured to display an image in a first display area using image data generated by an image capture unit and stored in a first memory area;

a receiver configured to receive an instruction to move the image from the first display area to a second display area identifying a second memory area;

a converter that, in response to the instruction, converts the image data into a format of the second memory area; and a second display controller configured to move and display, in response to the instruction, the image corresponding to the image data converted by the converter in the second display area, wherein the converter is configured such that, in response to an instruction to move, to the second memory area, image data of a first format generated for an image captured by the image capture unit and stored in a memory other than the first memory area, the converter is prohibited from converting the image data from the first format to the second format.

6. The data management device according to claim 5, wherein the image is a thumbnail generated based on the corresponding image data, and the second display controller displays the thumbnail that was being displayed in the first display area in the second display area.

7. The data management device of claim 5, wherein the first display area and the second display area are on a same device.

8. An information processing client comprising:

a display configured to display an image;

an image capture unit configured to generate image data by image capture; and the data management device according to claim 1.

9. A non-transitory computer readable medium storing a program causing a computer to execute a process for managing image data, the process comprising:

converting the image data, in response to an instruction to move, to a second memory area, image data of a first format generated for an image captured by an image capture unit and stored in a first memory area, from the first format to a second format; and storing, in the second memory area, the image data converted into the second format, wherein in response to an instruction to move, to the second memory area, image data of a first format generated for an image captured by the image capture unit and stored in a memory other than the first memory area, prohibiting the conversion of the image data from the first format to the second format.

10. The process of claim 9, wherein the image data of the first format is only converted to the second format in response to the instruction to move the image data of the first format to the second memory area.

11. A non-transitory computer readable medium storing a program causing a computer to execute a process for managing data, the process comprising:

displaying, in a first display area using image data generated by an image capture unit and stored in a first memory area, an image;

receiving an instruction to move the image from the first display area to a second display area identifying a second memory area;

in response to the instruction, converting the image data into a format of the second memory area; and in response to the instruction, moving and displaying the image corresponding to the converted image data in the second display area, wherein in response to an instruction to move, to the second memory area, image data of a first format generated for an image captured by the image capture unit and stored in a memory other than the first memory area, prohibiting the conversion of the image data from the first format to the second format.

12. The process of claim 11, wherein the first display area and the second display area are on a same device.

* * * * *